United States Patent [19]

Maier et al.

[11] Patent Number: 4,484,297

[45] Date of Patent: Nov. 20, 1984

[54] VARIABLE DATA BASE GENERATOR APPARATUS

[75] Inventors: James J. Maier, Clinton; Jeffrey P. Woodard, Rome; John V. Ferrante, Rome; Michael A. Heffron, Rome, all of N.Y.

[73] Assignee: The United States of America as represented by the Secretary of the Air Force, Washington, D.C.

[21] Appl. No.: 308,972

[22] Filed: Oct. 6, 1981

[51] Int. Cl.³ .................................................. G06F 7/58
[52] U.S. Cl. ..................................... 364/717; 364/900
[58] Field of Search .............. 364/717, 200, 900, 300, 364/200 MS File

[56] References Cited

U.S. PATENT DOCUMENTS

| | | | |
|---|---|---|---|
| 3,930,237 | 12/1975 | Villers | 364/300 X |
| 4,128,876 | 12/1978 | Ames et al. | 364/200 |
| 4,203,152 | 5/1980 | Watson et al. | 364/200 |
| 4,215,396 | 7/1980 | Henry et al. | 364/200 |
| 4,231,087 | 10/1980 | Hunsberger et al. | 364/200 |
| 4,414,629 | 11/1983 | Waite | 364/300 |

Primary Examiner—Gareth D. Shaw
Assistant Examiner—Ronni S. Malamud
Attorney, Agent, or Firm—Donald J. Singer; William Stepanishen

[57] ABSTRACT

An apparatus for generating a variable data base file from a single original entry control datum. The apparatus utilizes a microprocessor unit to interact with a logical number generator to modify the original entry control signal into a larger data base which may be similar to but not identical to the original datum signal.

5 Claims, 4 Drawing Figures

VARIABLE DATA BASE GENERATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a binary word generator apparatus, and in particular to a variable data base generator apparatus.

In many fields of scientific endeavor, situations exist that require a source of random numbers. One typical example is simulating actual operating conditions while testing a piece of apparatus. In this case, a series of random numbers might represent different operating conditions.

Commonly, random numbers in binary form are generated in digital computers by the so-called multiplicative-congruential methods. These methods, however, yield numbers that are only random in the higher denominational order bit positions.

Random numbers can be formed by the accumulation of random bits in a shift register. Each random bit is derived from a random noise voltage. A random number is thus obtained with a single input operation—much faster than with an algorithmic generator. However, this simple scheme develops random numbers having nonideal statistical properties because the circuits used are not ideal. Unavoidable unbalance in the sampler circuits will introduce a bias in the random bits. In addition, correlation between neighboring bits could result from a limited noise bandwidth as well as sampler hysteresis. There exist methods which are used to eliminate the bias of random bits. However, in these older methods the choice between one or the other value for a given bit is influenced by an average of values of bits previously produced. The introduction of said average leads to undesired long-term correlations.

SUMMARY OF THE INVENTION

The present invention utilizes an input scanner to acquire an original signal which is converted to a digital word and stored in a reference file. The digital word is divided into samples by a computer and grouped into a number of variable bytes. The bytes are variable in that the bits within a byte may be interchanged or varied in position within the byte. A signal modifier unit which is controlled by a random number generator, modifies the byte groups by changing or intermixing the groups in a random manner to create simulated data.

It is one object of the present invention, therefore, to provide an improved variable data base generator apparatus.

It is another object of the invention to provide an improved variable data base generator apparatus to create simulated data which may be similiar or dissimilar to the original data.

It is another object of the invention to provide an improved variable data base generator apparatus wherein larger data base is created from a smaller data base.

It is another object of the invention to provide an improved variable data base generator apparatus wherein an original data is utilizes to create simulated data.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
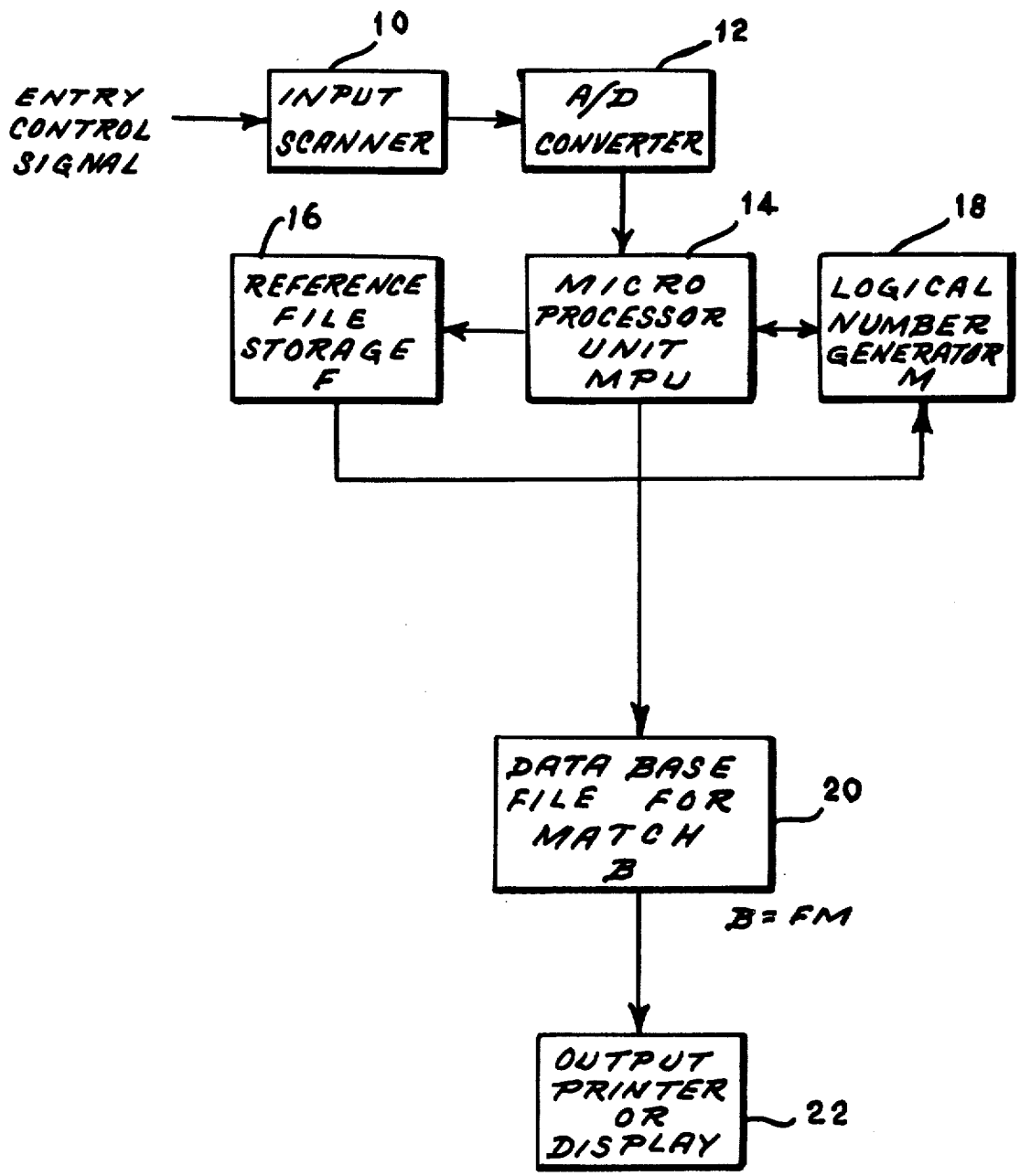
FIG. 1 is a block diagram of the variable data base generator apparatus according to the present invention.

Referring now to FIG. 1, there is shown a variable data base generator apparatus utilizing an input scanner unit 10 to receive a control entry signal. The control entry signal may comprise any type or form entry control data such as a fingerprint, signature, voice or other form. The entry control signal is applied through the input scanner unit 10 to the A/D converter unit 12 for conversion to a digital signal. The digital signal is applied to the microprocessor unit 14 which then files the digital signal in the reference file storage F unit 16. The operation for the creation of the larger data base begins when the microprocessor unit 14 sends a digital command to both the reference file storage unit 16 and the logical number generator unit 18. In response to the digital command, the digital signal from the reference file storage unit 16 is sent to the logical number generator unit 18 for temporary storage. The logical number generator unit 18 may comprise either a random or a non-random number generator unit. After filing the digital signal in the logical number generator unit 18, the microprocessor unit 14 initiates another command to the logical number generator unit 18 to modify the digital signal in a random fashion by a factor, M. It should be noted that the digital signal may be modified in either a random or a non-random fashion, however, for the present discussion a random technique will be presented. The modification of the digital signal in the logical number generator unit 18 by the factor, M, involves either changing specific data bits or groups of bits, or the intermixing of the original file. The logical number generator unit 18 modifies the data in a random fashion such that the simulated file itself is neither like the original or any previous simulated file. By utilizing known information of the standard deviation of the original data, the simulated data may be created to be as similar or dissimilar to the original as desired. Another approach to creating a simulated file is to utilize only the original data as a mask, and modify all of the original data instead of just portions of it. In either case, the final or new data base which is created as a result of the original reference file F and the modifier M, is the matching Data Base B which is the result of the reference and the modifier. The new data base may be shown or designated as B=FM.

The logical number generater unit 18 interacts with the microprocessor unit 14 to amplify and expand the digital word such that another datum is created similar, but not identical to the original datum, selected by the microprocessor unit 14 and cycled through the system. When the operation is complete, the microprocessor unit 14 sends the new datum to the expanded data base file unit B. Thus, the expanded date base is larger, but similar to the original reference file signal. The data is outputted to the output printer unit 22 for analysis, where both the original data base, and the expanded data base can be displayed. The output printer unit 22 may also print out or display the files either prior to modification or after simulation. The microprocessor unit 14 can access both data bases upon request.

The reference data base is created first from real data from a person's interaction with the input scanner. The expanded data base B is all created within the confines of the computer blocks and does not utilize the input scanner 10 or the A/D converter Unit 12. The expanded data base is all non-real data created by the computer, while the reference file data is actual data taken from the person's interaction with the input scanners. The central idea in this invention is the use of original data to create simulated data which is close to the original, but not the same. The objective is to utilize any entry control data such as fingerprint, signature, or voice or others which can then be modified sufficiently to provide additional data that is close to the original but not the same.

Figure 2:
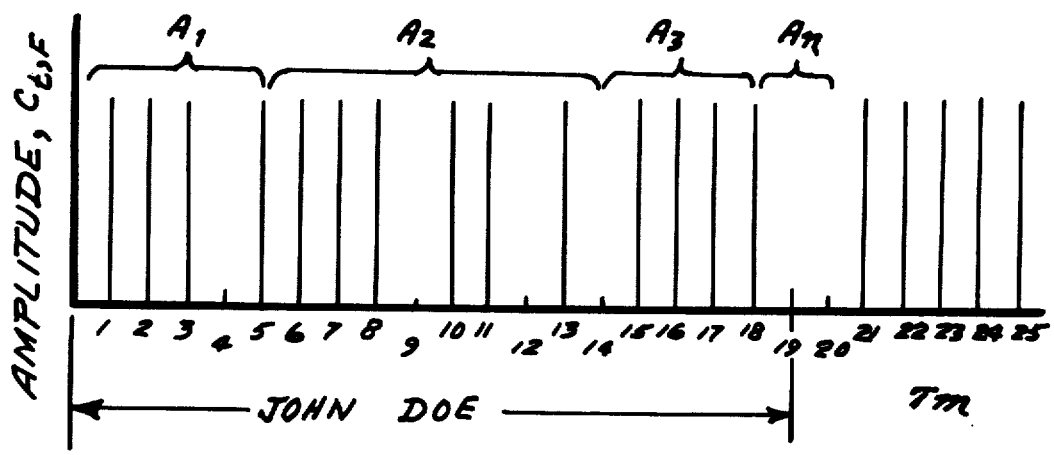
FIG. 2 is a graphical representation of an original data input which has been connected to a digital format and grouped.

The original data may be represented by a digital signal which consists of Tm pulses. The pulses may be further grouped into variable bytes that are specified as An groups, which are shown in FIG. 2. The term variable bytes is defined as a byte or bytes in which the bits within a byte may be interchanged or varied in position within the byte. For example, $A_1$ may encompass time/phase positions 1,2,3,4, while $A_2$ encompasses 5,6,7,8,9,10,11,12. These samples may be interpreted such that the new data signal resembles the original signal, but is different, and thus can be utilized to simulate one file which is different than the original. In any case the data base, which is created as a result of the original reference file and the modifier in the matching data base (B) is the result of the reference and the modifier.

Figure 3:
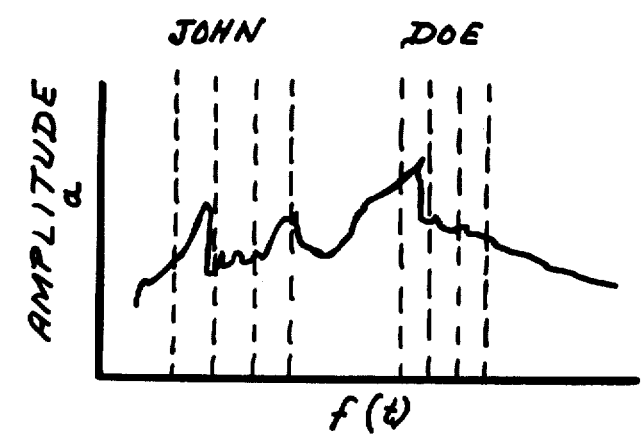
FIGS. 3 and 4 are graphical representations respectively of a control entry signed in its original form and in its grouped digital form.
Figure 4:
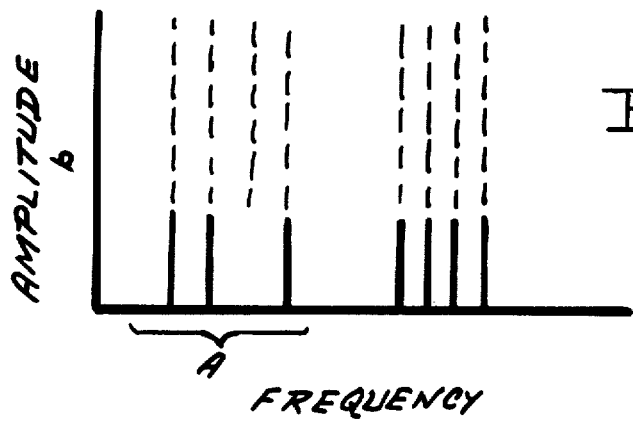

There is shown in FIG. 3, a time function diagram of a data entry base which represents an entry control signal. Thus, both charcteristic signals can be changed by the variable data base system by formatting the original into the form as shown in FIG. 2 and changing the values or positions of the bytes by the use of a computer. In the case of FIGS. 3 and 4, the A values correspond to groups of samples which are either time or frequency samples. It may be noted that the artificial data is created by intelligently changing the A values in such a way that the simulated data is similar but different enough to be utilized as test data. The use of an output printer enables this function to be a product of an analysis being done by a combination of man-machine decision inputs.

While the present invention has been shown and described with respect to specific conventional units which are arranged in a particular configuration, it will be well understood that the following circuits and or units may be utilized to implement the present invention. For example, the input scanner unit is a transducer which is best described in the data domain. Such a transducer is shown and described in, "An analysis of Digital and Analog Instrumentation Systems and Components" by C. G. Enke, as reported in Microcomputers, Hardware, Software and Applications, IEEE Press 1972.

The reference output printer and display unit is also described in "An Analysis of Digital and Analog Instrumentation Systems and Components". The reference A/D converter is a standard functional block as best described on page 666 in "Integrated Electronics, Analog and Digital Circuits and Systems", Millman and Halkios, McGraw Hill, 1972, and reference IEEE Spectrum, pp, 63, July 1972. The reference file storage unit F and the data base file unit B are similar to the files as described under "Functional Analysis of Information Processing" by Grayce M. Booth, John Wiley & Sons, 1973, reference pp. 100, FIGS. 6–8. Both the reference file storage unit F and the data base file unit B can be stored in a random access memory as described on page 658, FIG. 17-55 "Integrated Electronics", Millman, Halkios, McGraw Hill, 1972. A microprocessor unit would be the adder or subtractor of the original digital data that which would then generate the new digital data that represents new sets of datum. The microprocessor unit is described on page 40-20 "Reference Data for Radio Engineers", Howard W. Sams & Co., 1977. The logical number generator unit which may be a random number generator, is a common functional unit and is capable of outputting a random sequence of digital pulses. Such generators are described in "The Monte Carlo Method" by Y. U. Schreider Program Press, 1966 and by "Generation of Random Bits with Accuratge and Reproducible Statistical Properties" by F. Costonie, pgs 807, proceedings of the IEEE Vol. 66, No. 7, July 1978, Although the invention has been described with reference to a particular embodiment, it will be understood to those skilled in the art that the invention is capable of a variety of alternative embodiments within the spirit and scope of the appended claims.

What is claimed is:

1. A variable data base generator apparatus comprising in combination:
   an input scanner means to receive an entry control signal, said input scanner means providing an analog signal in response to said entry control signal as an output,
   an A/D converter means receiving and converting said analog signal to a digital signal,
   a microprocessor means to receive said digital signal, said microprocessor means grouping said digital signal into a number of bytes,
   a reference file means connected to said microprocessor means to receive said digital signal therefrom, said digital signal being stored within said reference file means,
   a logical number generator means connected to both said microprocessor means and said reference file means, said microprocesser means initiates a command signal to said reference file means which transfers said digital signal to said logical number generator means, said microprocessor means and said logical number generator means interact to modify said digital signal to generate a simulated file, and,
   a data base file means connected to said microprocessor means to receive both said digital signal and said simulated file therefrom, said data base file means storing said digital signal and said simulated file.

2. A variable data base generator apparatus as described in claim 1 further including an output printer to receive said digital signal and said simulated file from said data base file means, said output printer providing a printout of said digital signal and said simulated file.

3. A variable data base genreator apparatus as described in claim 1 wherein said number of bits within a word are variable in position only.

4. A variable data base generator apparatus as described in claim 1 wherein said microprocessor means in cooperation with said logical number generator means interchanges the position of said bytes through a random series of repetitive cycles.

5. A variable data base generator apparatus as described in claim 1 wherein said microprocessor means in cooperation with said logical number generator means interchange the position of the bits in said bytes.

* * * * *